United States Patent
Tsai et al.

(12) 
(10) Patent No.: US 6,731,659 B1
(45) Date of Patent: May 4, 2004

(54) FREQUENCY LOCKER

(75) Inventors: John C. Tsai, Saratoga, CA (US); David W. Wang, Saratoga, CA (US)

(73) Assignee: Fibera, Inc., Santa Clara, CA (US)

( * ) Notice: Subject to any disclaimer, the term of this patent is extended or adjusted under 35 U.S.C. 154(b) by 0 days.

(21) Appl. No.: 10/039,276

(22) Filed: Jan. 4, 2002

Related U.S. Application Data (63) Continuation-in-part of application No. 09/798,721, filed on Mar. 1, 2001.
(60) Provisional application No. 60/241,569, filed on Oct. 18, 2000.

(51) Int. Cl.[7] .............................. H01S 3/098; H01S 3/15
(52) U.S. Cl. ........................................... 372/18; 372/32
(58) Field of Search ..................... 372/18, 32; 250/205; 356/139.07

(56) References Cited

U.S. PATENT DOCUMENTS

| | | | | |
|---|---|---|---|---|
| 3,762,821 A | * | 10/1973 | Bruning et al. | 356/139.07 |
| 4,701,607 A | * | 10/1987 | El-Hanany et al. | 250/205 |
| 5,081,635 A | | 1/1992 | Wakabayashi et al. | |
| 5,136,572 A | * | 8/1992 | Bradley | 369/108 |
| 5,287,366 A | | 2/1994 | Epworth et al. | |
| 5,867,266 A | * | 2/1999 | Craighead | 356/344 |
| 6,214,246 B1 | * | 4/2001 | Craighead | 216/56 |
| 6,243,403 B1 | * | 6/2001 | Broutin et al. | 372/32 |

* cited by examiner

*Primary Examiner*—Paul Ip
*Assistant Examiner*—Huang T. Vy
(74) *Attorney, Agent, or Firm*—Raymond E. Roberts; IPLO Intellectual Property Law Offices (57) ABSTRACT

A frequency locker (100) for working with external light sources or frequency locked light sources (200, 300, 400) having integrated laser light sources (214, 414). The locker (100) provides multi-channel frequency tuning and stabilization with common components, particularly including common beam splitters (114, 118), an interferometer (128), and a processing circuit (138). The locked light source (200) integrates a light source (214) and single channel frequency tuning and stabilization capabilities. The locked light source (300) integrates multiple instances of the locked light source (200) within a single housing (312) to provide multi-channel capability. And the locked light source (400) provides multi-channel frequency tuning and stabilization with common components, particularly including a single beam splitter (420), an interferometer (426), and a processing circuit (434).

30 Claims, 8 Drawing Sheets

FIG. 1 (background art)
Single-Wavelength Frequency Locker

FIG. 4
Multi-Wavelength Frequency Locker

FREQUENCY LOCKER

CROSS-REFERENCE TO RELATED APPLICATIONS

This is a continuation-in-part of application Ser. No. 09/798,721, filed Mar. 1, 2001, which claims the benefit of U.S. Provisional Application No. 60/241,569, filed Oct. 18, 2000.

TECHNICAL FIELD

The present invention relates generally to coherent light generator systems, and more particularly to systems for controlling the frequency of light used in such systems. It is anticipated that a primary application of the present invention will be in telecommunications, but the present invention is also well suited to use in laboratory measurement and other fields.

BACKGROUND ART

The ability to measure and control light wavelength or frequency is highly useful in industry and basic research. The telecommunications industry provides one excellent example, and it will be used occasionally herein. [Since the speed of light is constant in a given medium, it should also be understood that the wavelength and the frequency of radiation have a fixed relationship. Thus, although it is possible to speak here of "wavelength locking" or "frequency locking," for ease of reference "frequency locking" and variants thereof are used. The term "wavelength" is also used, but sparingly to denote where multiple wavelengths may be present and where multiple channel processing may be desirable.]

Numerous systems exist to measure frequency in some manner, and to control a light source to provide or maintain a specific frequency. These, however, suffer from a number of limitations. Co-pending U.S. application Ser. No. 09/798,721 by one of the present inventors for a "Light Frequency Locker," incorporated herewith by reference, provides a discussion of single channel prior art and of prior art systems known to the present inventors that do not integrate the light source and the light frequency control mechanism, i.e., additional major novel aspects of the present invention. Accordingly, the following discussion provides background particularly germane to the invention of this patent application.

Figure 1:
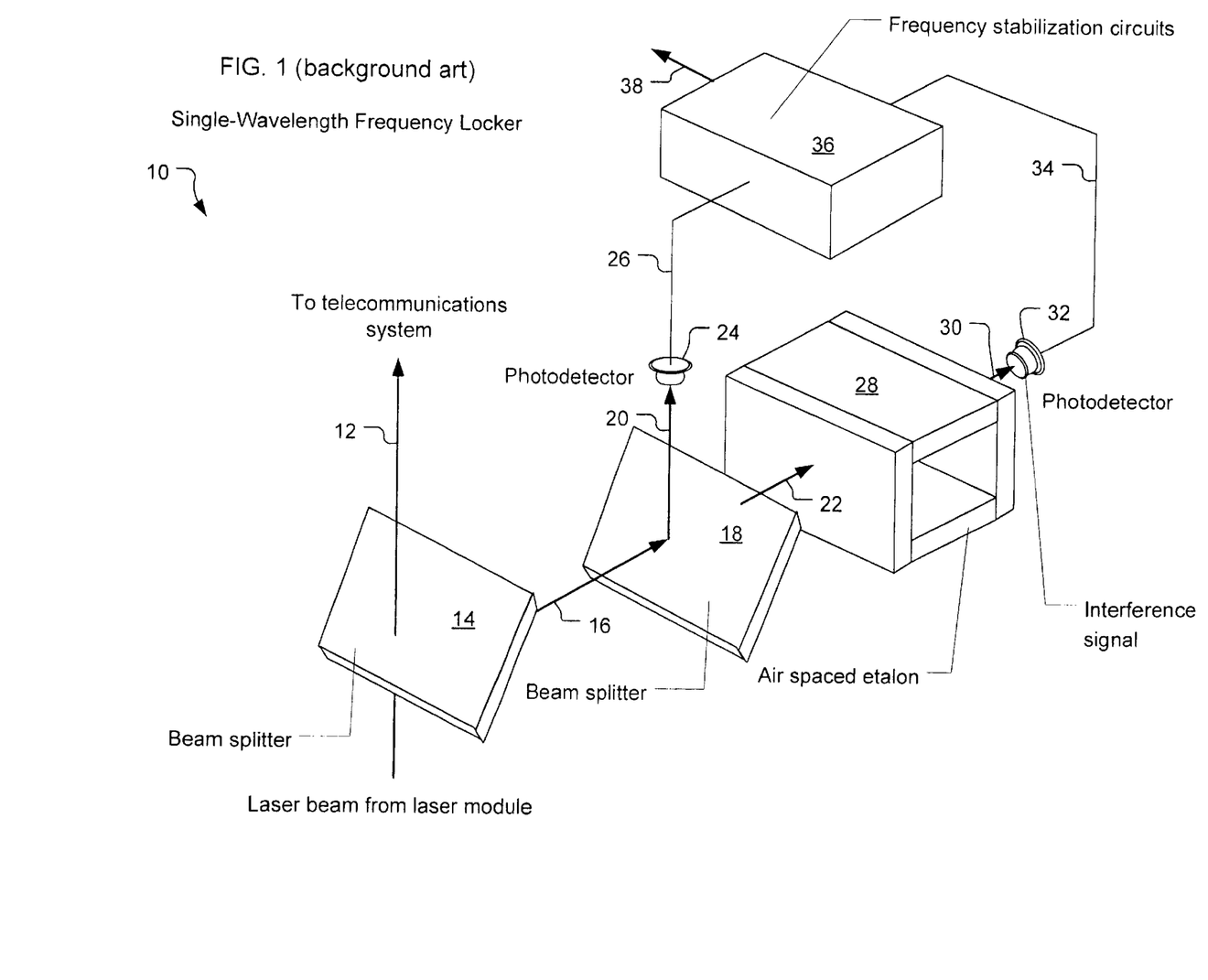
FIG. 1 (background art) is a perspective view of a single channel frequency locker.

FIG. 1 (background art) is a perspective view of the major operational elements of a single channel frequency locker 10. A laser light source (not shown) produces a laser beam 12 which is directed through a first beam splitter 14 to produce a control beam 16. The laser light source may be quite removed from the locker 10, as implied here, and various optical devices like fiber optic cable may be used to route the laser beam 12 into the first beam splitter 14 or to receive it as it exits and route it onward for use in some end application. Typically only a small portion of the laser beam 12 is "split" out in this manner and used as the control beam 16.

The laser beam 12 has a single light wavelength of interest, although others may also be present so long as they do not significantly effect the operation of the locker 10. In particular, in many applications the laser beam 12 is modulated to carry information. The purpose of the locker 10 is to lock the light frequency of the laser beam 12 to a desired frequency.

The control beam 16 is directed into a second beam splitter 18 to produce a reference beam 20 and a measurement beam 22. The reference beam 20 is directed to a reference detector 24, where it produces a reference signal 26. The measurement beam 22 is directed to an interferometer 28 to produce an interference beam 30. The interference beam 30 is then directed to an interference detector 32, where it produces an interference signal 34.

The beam splitters 14, 18, the detectors 24, 32, and the interferometer 28 may be conventional commercially available units. For example, the beam splitters 14, 18 may be what are often termed "half-silvered mirrors," although the reflective material may not be silver and the reflectivity to transmitting balance may not be half and half. The detectors 24, 32 may be photodetectors, such as photodiodes.

Many types of devices are suitable for the interferometer 28. An air-spaced Fabry-Perot etalon is shown in FIG. 1, but solid etalons or diffraction gratings are examples of other suitable devices. In particular, however, the interferometer 28 is chosen to produce a usable amount of interference for the desired frequency of the laser beam 12.

A processing circuit 36 is further provided to receive both the reference signal 26 and the interference signal 34 and to produce a correction signal 38. The reference signal 26 is representative of the "raw" light intensity in the control beam 16 at any given moment. In contrast, the interference signal 34 is representative of the light frequency in the control beam 16, and thus also in the laser beam 12. By combining these signals, typically using differential amplification techniques, the processing circuit 36 is able to normalize for intensity variation in the control beam 16 and to further determine if frequency variation, i.e. "drift," has occurred. It then can produce the correction signal 38 accordingly.

The correction signal 38 is used as feedback to the laser light source to achieve frequency control as the laser beam 12 is being produced. In this manner any drift can be detected while it is still minor and can promptly be corrected for, thus "locking" the light frequency to the desired frequency. The above discussion of the single channel frequency locker 10 is brief and does not cover non-germane matters, like tuning to an initial light frequency, but rather is intended to serve as a basis for the following discussion.

The locker 10 shown in FIG. 1 illustrates several points. It is a stand alone unit, physically separated from the laser light source it is used with. Historically this has been the case in this art. Laser modules, containing a laser and a mechanism to control its light frequency, have been produced as one physical unit while the frequency lockers that direct operation of the control mechanism have been separate physical units. The laser modules and locker units are then combined, typically by a designer for use in an end application.

This unfortunately has a number of disadvantages. The costs of this approach are unduly high. There is an added direct cost for using two different units, often from two different providers. Another consideration is the added indirect cost of designing combinations into end applications where there ultimately is only one problem to be solved: providing a frequency locked light source.

Of growing importance, also, is the ultimate form-factor of a frequency locked light source. Using two discrete parts tends to undesirably increase the surface area or volume required. Today minimizing the form-factor is important in many applications, particularly as many such applications use multiple frequency locked light sources together and the surface area and volume required for this becomes quite appreciable.

There are yet other disadvantages, such as minimizing counts of stocked spares, the economics of dealing with multiple vendors, and even operational interference between the units. For instance, if a laser module uses heating to adjust light frequency, waste heat from this can adversely effect the frequency locker unit. Similarly, if cooling is used, adjacent components may be cooled somewhat as well. It is not possible to catalog all of the possible disadvantages here, but those noted are major ones and they serve to make the point that using two devices to solve one problem may be unduly complex or expensive.

Figure 2:
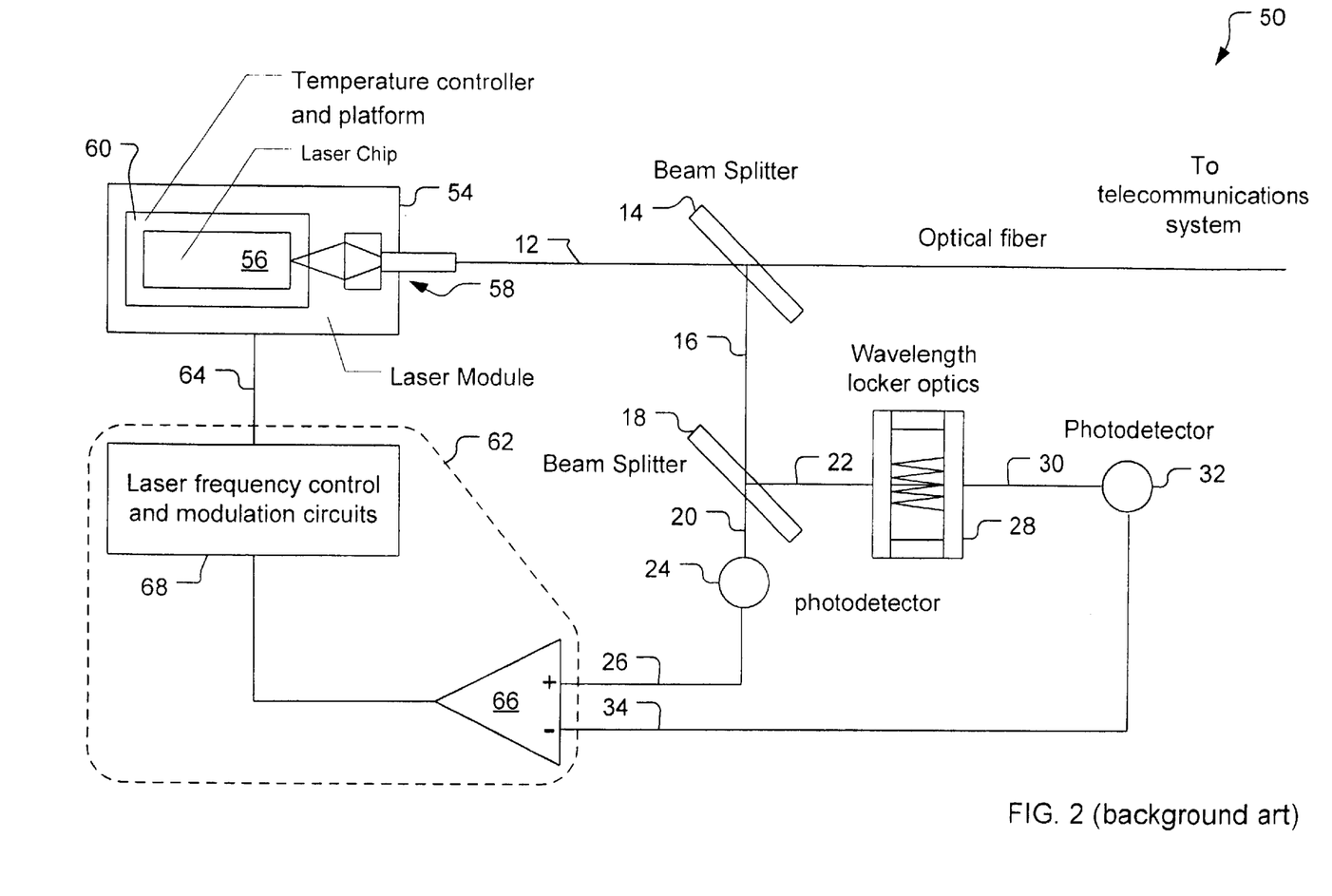
FIG. 2 (background art) is a schematic view of a single channel frequency locked light source, including the single channel frequency locker of FIG. 1.

FIG. 2 (background art) is a schematic view of a single channel frequency locked light source 50, essentially including the single channel frequency locker 10 of FIG. 1. A laser module 54 is now provided. It includes a laser chip 56 able to produce the laser beam 12, with some collimating optics 58 also depicted.

The laser module 54 here includes a temperature unit 60. Heating and cooling the laser chip 56 are common ways to adjust the frequency of the laser beam 12. The temperature unit 60 here may do either, or even both across time as operating requirements change.

A control circuit 62 that is somewhat different than the processing circuit 36 of FIG. 1 is shown, and the correction signal 38 is now one among other control signals 64. The control circuit 62 here includes a differential amplifier 66. As noted, above, a differential processing approach is commonly used to normalize with respect to light intensity variation in the laser beam 12. The control circuit 62 also includes a processing circuit 68 that performs both frequency stabilization and modulation related processing here. There is much to be gained by integrating all of the processing tasks into one circuit in the manner of the control circuit 62 here. For instance, a common power supply and micro-processor components can be used in the processing circuit 68.

Those skilled in the relevant arts here, and particularly in the optical and electronic arts, will appreciate that combining light source and frequency locking into one unit like the locked light source 50 can overcome or reduce many of the disadvantages for multiple discrete devices discussed above. It is the inventors' understanding that integrated single channel frequency locked light sources like that just described are just now entering the market.

Figure 3:
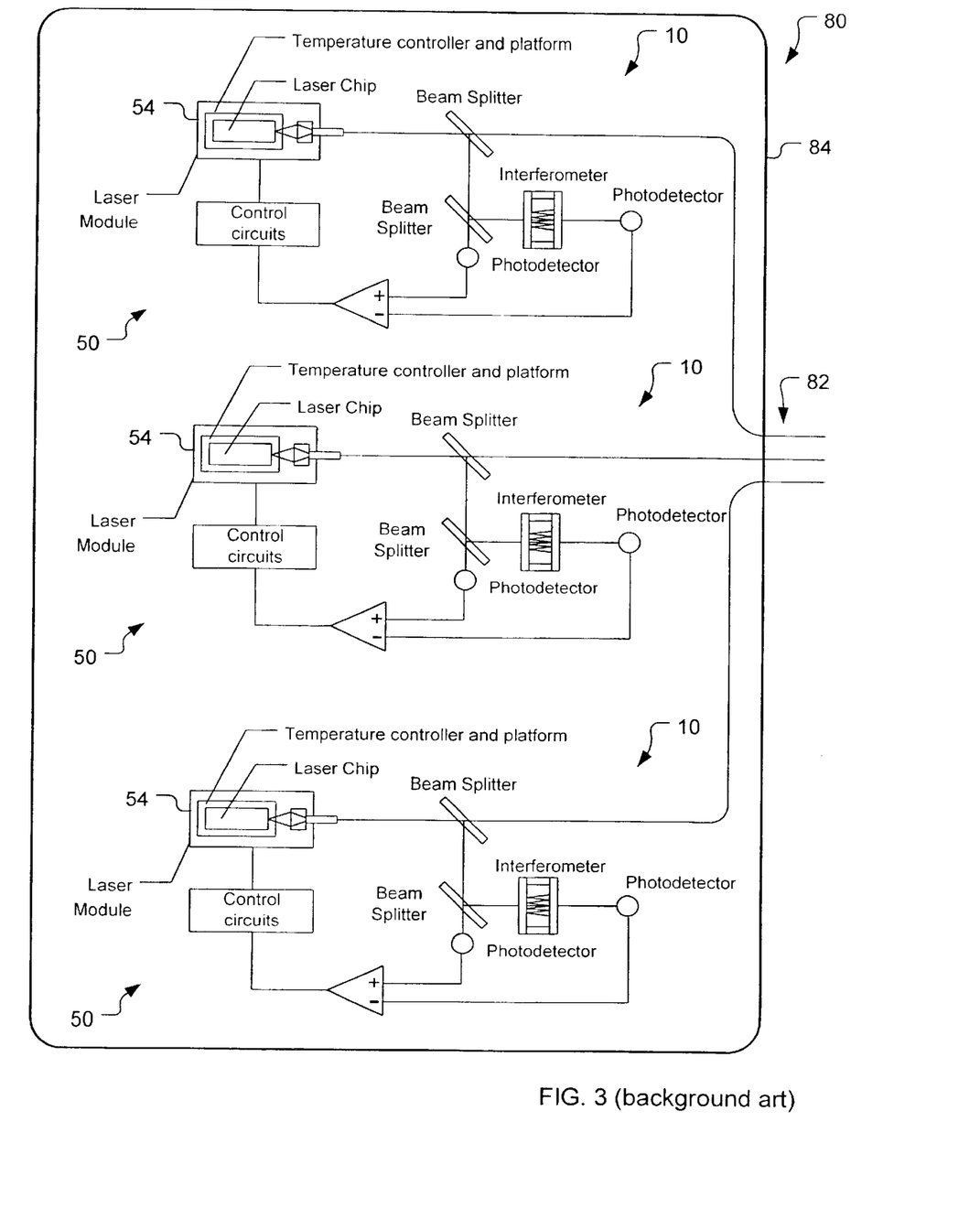
FIG. 3 (background art) is a schematic view of a multi-channel frequency locked light source, including a plurality of the frequency locked light sources of FIG. 2.

FIG. 3 (background art) is a schematic view of a multi-channel (i.e., typically multi-wavelength) locked light source 80. This represents the known current state of the art when it comes to producing multiple frequency locked laser beams 82. Essentially, a plurality of the locked light sources 50 of FIG. 2 are used to construct an aggregate unit 84. The burden of doing this, however, is still left for the designer of the end application.

The locked light source 80 in FIG. 3 is a three channel system, able to produce three of the laser beams 82 that each may have a respective light frequency. This is actually a quite simple system, in view of current end application complexity.

An appreciation for the cost and effort involved in designing end applications around the currently available technology can be had by considering the increasingly common example of dense-wavelength division multiplexing used in fiber optic telecommunications. Today 40 and even 80 channel fiber optic systems are in use, and production of 160 and 320 channel systems are contemplated. A corresponding number of modulated light wavelengths is needed, and these need to be frequency locked, say, to the standard frequencies set by the International Telecommunication Union (ITU). Employing even 40 discrete instances (i.e., channels) of the locked light sources 50 of FIG. 2 is daunting, however. If the frequency of a single laser (i.e., channel) drifts it can adversely effect both its own utility as well as the utility of an adjacent channel. This can undermine the reliability of and the confidence in the entire system. Furthermore, it is even likely that frequency drift in such systems will occur concurrently in multiple channels; adjacent channels can then drift together and interfere even more easily.

Turning again to FIGS. 2 and 3, it can be seen that the locked light source 80 includes a lot of component similarity. For example, each locked light source 50 or "channel" there has a first beam splitter 14, a second beam splitter 18, an interferometer 28, a differential amplifier 66, and a processing circuit 68. Each such similar component has an associated cost by itself, as it relates to its role within the channel, and within the overall scheme. Each optical and electrical component must be individually fabricated, tested, installed, and adjusted. Yet, if merely one fails, the entire locked light source 80 may be rendered unusable or deemed untrustworthy. The disadvantages of such an approach are many.

DISCLOSURE OF INVENTION

Accordingly, it is an object of the present invention to provide an improved frequency locker.

Another object of the invention is to provide an improved frequency locking light source.

And another object of the invention is to provide multi-channel frequency locking light source.

Briefly, a second preferred embodiment of the present invention is a multi-channel frequency locker to lock a number of tunable light sources producing light beams having respective light frequencies. A detection system is supplied to produce and provide to the tunable light sources respective correction signals representing any differences in frequency between the light frequencies and desired frequencies. The detection system includes at least one optical component common to the light beams.

Briefly, a second preferred embodiment of the present invention is a frequency locking light source. A laser is provided to produce at least one light beam having a light frequency, and a tuning system is provided to adjust the laser to change the light frequency based on a correction signal. A detection system is provided to produce the correction signal representing any difference in frequency between the light frequency and a desired frequency. The laser, tuning system, and detection system are all integral within a single housing.

Briefly, a third preferred embodiment of the present invention is a multi-channel frequency locker to lock a number of tunable light sources producing light beams having respective light frequencies. A detection system is supplied to produce and provide to the tunable light sources respective correction signals representing any differences in frequency between the light frequencies and desired frequencies. The detection system includes at least one optical component common to the light beams.

An advantage of the present invention is that it provides a frequency locker which may handle multiple wavelength-channels without a per channel scaling of components or manufacturing and usage upkeep related labor.

Another advantage of the invention is that it may be integrated with a light source and tuning mechanism, or multiple channels of these, to form complete frequency locking light source solutions.

Another advantage of the invention is that coincides with the growing need in industry for small form-factor frequency locking capability, both for single and multi-channel applications.

Another advantage of the invention is that its multi-channel embodiments inherently have easy initial calibration capability, easy recalibration capability once in use, and improved reliability.

And another advantage of the invention is that is it highly economical, both to fabricate and to operate. The invention's use of common and integrated components reduces materials costs significantly, particularly since the very components that the invention can combine are those typically costing most in prior art approaches. The invention similarly requires less labor in assembly and set-up. It provides a complete locked light source, if desired, and thus avoids the prior art design burden of having to work with tunable light sources and tuning and stabilization systems that are discrete.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended figures of drawings in which.

In the various figures of the drawings, like references are used to denote like or similar elements or steps.

BEST MODE FOR CARRYING OUT THE INVENTION

A preferred embodiment of the present invention is a frequency locker, which particularly may optionally include a light source to thus provide a locked light source. As illustrated in the various drawings herein, and particularly in the view of FIG. 4, a first preferred embodiment of the invention is depicted by the general reference character 100.

Figure 4:
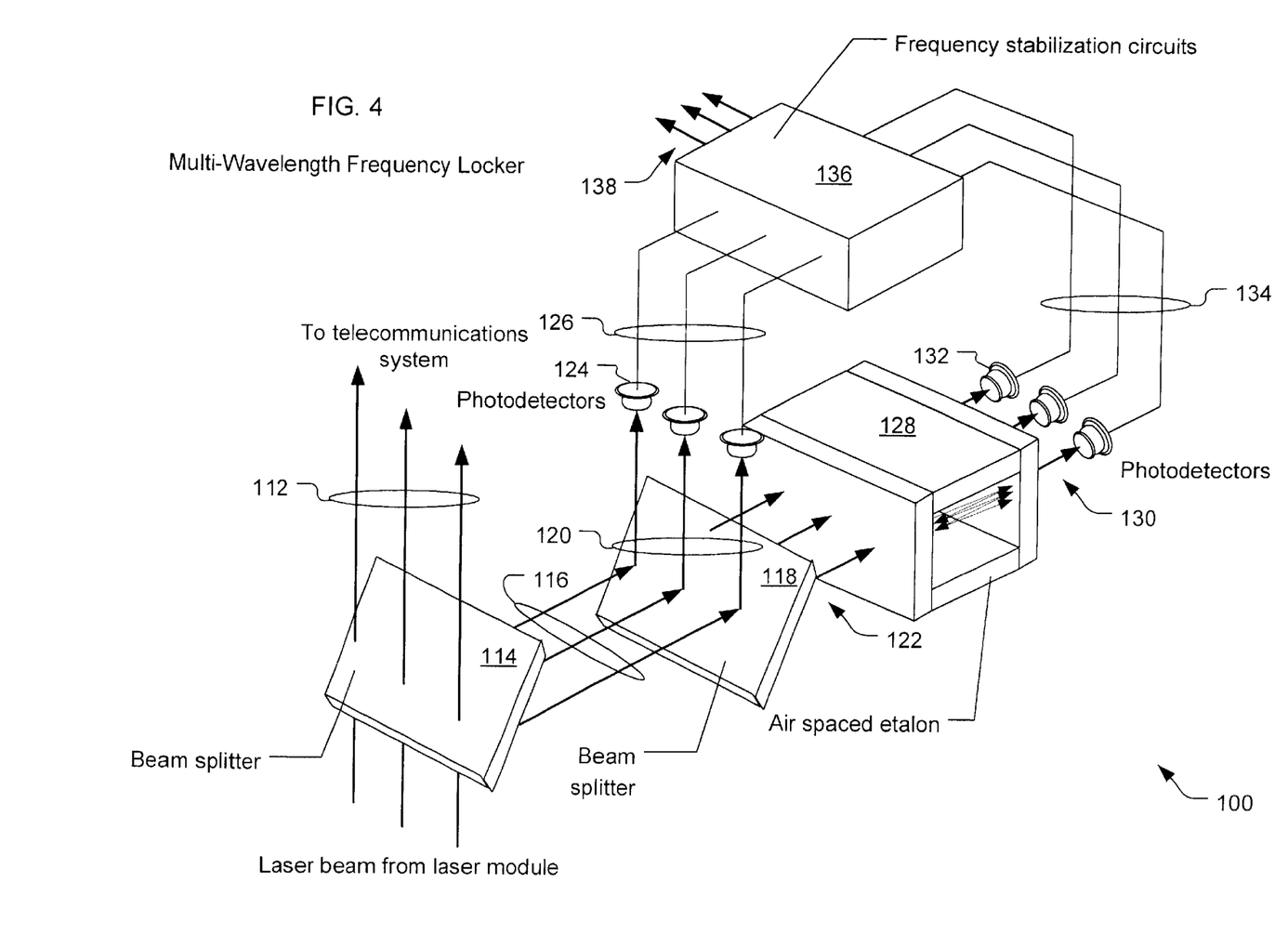
FIG. 4 is a perspective view of a multi-channel frequency locker according to the present invention.

FIG. 4 is a perspective view of a multiple light wavelength or "multi-channel" frequency locker 100 according to the present invention. A plurality of laser light sources (not shown) produce laser beams 112 which are directed through a single, common first beam splitter 114 to produce respective control beams 116. Only a small portion of the laser beams 112 need be split out in this manner, say 5% to 50%. The control beams 116 are directed into a single, common second beam splitter 118 to produce respective reference beams 120 and measurement beams 122. The reference beams 120 are each directed to reference detectors 124, to produce reference signals 126. The measurement beams 122 are directed through a single, common interferometer 128 to produce respective interference beams 130. The interference beams 130 are then directed to respective interference detectors 132, to produce interference signals 134. A processing circuit 136 is further provided to receive both the reference signals 126 and the interference signals 134, and to produce respective correction signals 138 based on these. The correction signals 138 are usable as feedback to the laser light sources to control the light frequency of the laser beams 112 as they are being produced.

The interferometer 128 shown in FIG. 4 (as well as figures for the other embodiments, discussed presently) is an air-spaced etalon type, but many suitable equivalents exist. For example, without limitation, solid etalons and interference filters and gratings may be used instead. Co-pending U.S. application Ser. No. 09/798,721 by one of the present inventors for a "Light Frequency Locker," incorporated herewith by reference, teaches the use of a common diffraction grating in a multi-channel locker.

There are many parallels between the single channel frequency locker 10 of FIG. 1 (background art) and the multi-channel frequency locker 100 of FIG. 4. A key point to be taken, however, is that the component count in the latter does not increase as a factor of the channel count. The multi-channel frequency locker 100 of FIG. 4 is a three channel system, since it handles three laser beams 112, presumably from three laser light sources, and it produces three respective correction signals 138 which are usable to frequency lock the light sources.

The use of common components is maximized in FIG. 4. By "common" we herein mean "shared," verses "conventional" (although the common components may or may not also be conventional in their nature). Thus, FIG. 4 illustrates that rather than use three pairs of beam splitters, three interferometers, and three stabilization circuits, only one of each can be used.

Once the principals of the invention are grasped there is no reason that common components be used for merely three channels, as shown in FIG. 4. For example, in another embodiment the component equivalent to the first beam splitter 114 might instead handle ten laser beams and produce ten control beams. Two second beam splitters might then be used, for instance, to each handle five of the control beams. Ten interferometers might be used, say, if the control beams had ten completely unrelated light frequencies. But even this may not be necessary. Recall that an interferometer produces constructive and destructive interference, as well as varying levels of interference in between. Maximum amplitude in an interference signal indicates complete constructive interference and minimum amplitude indicates complete destructive interference, but there is no reason that one has to use one of these extremes. In fact convention in this are is otherwise, since the use of a mid-level optimal amplitude permits easy determination of whether frequency drift is upward or downward based whether amplitude increases or decreases (e.g., as is typically done with the ITU grid of standard frequencies). Thus, a mid-level amplitude may be chosen and used here. Normalized change in an interference signal away from the chosen amplitude can then be the basis used to produce an appropriate corrective signal.

If the control beams are related, the matter of serving multiple channels with as few as one interferometer is greatly simplified. Accordingly, returning to FIG. 4, if the three laser beams 112 there have desired frequencies coinciding with ITU standard frequencies, the single interferometer 128 there produces interference in all three channels that can be productively used. Consider these simplified example scenarios to illustrate this concept. If the intensities of the three laser beams 112 are equal, the reference detectors 124 will produce equal reference signals 126. If the control beams 116 (and thus also the laser beams 112) have desired frequencies according to the ITU standard, and if their actual light frequencies deviate from their respective desired frequencies equivalently, the interference detectors 132 will all produce equal interference signals 134. It then follows, in this simplified and atypical example scenario, that the processing circuit 136 will produce three equal correction signals 138.

Of course, the intensities of the laser beams 112 will, however, rarely be equal to each other at any given time or even to themselves across periods time. The drifts of the light frequencies will also rarely be equivalent. Hence, the reference signals 126 will generally be needed for normalization and the respective correction signals 138 will rarely, coincidentally be equivalent.

The processing circuit 136 has to handle all of the reference signals 126 and all of the interference signals 134. But, even if entirely separate channel processing circuitry is used, for instance, other circuitry such as the power supply can still be common. Furthermore, in many embodiments multiplexing techniques can be used to make common a considerable part of the processing circuitry. For that matter, the correction signals 138 may even be multiplexed into one signal for communication to the laser light sources, although such a signal would generally then have to be de-multiplexed for use.

Figure 5:
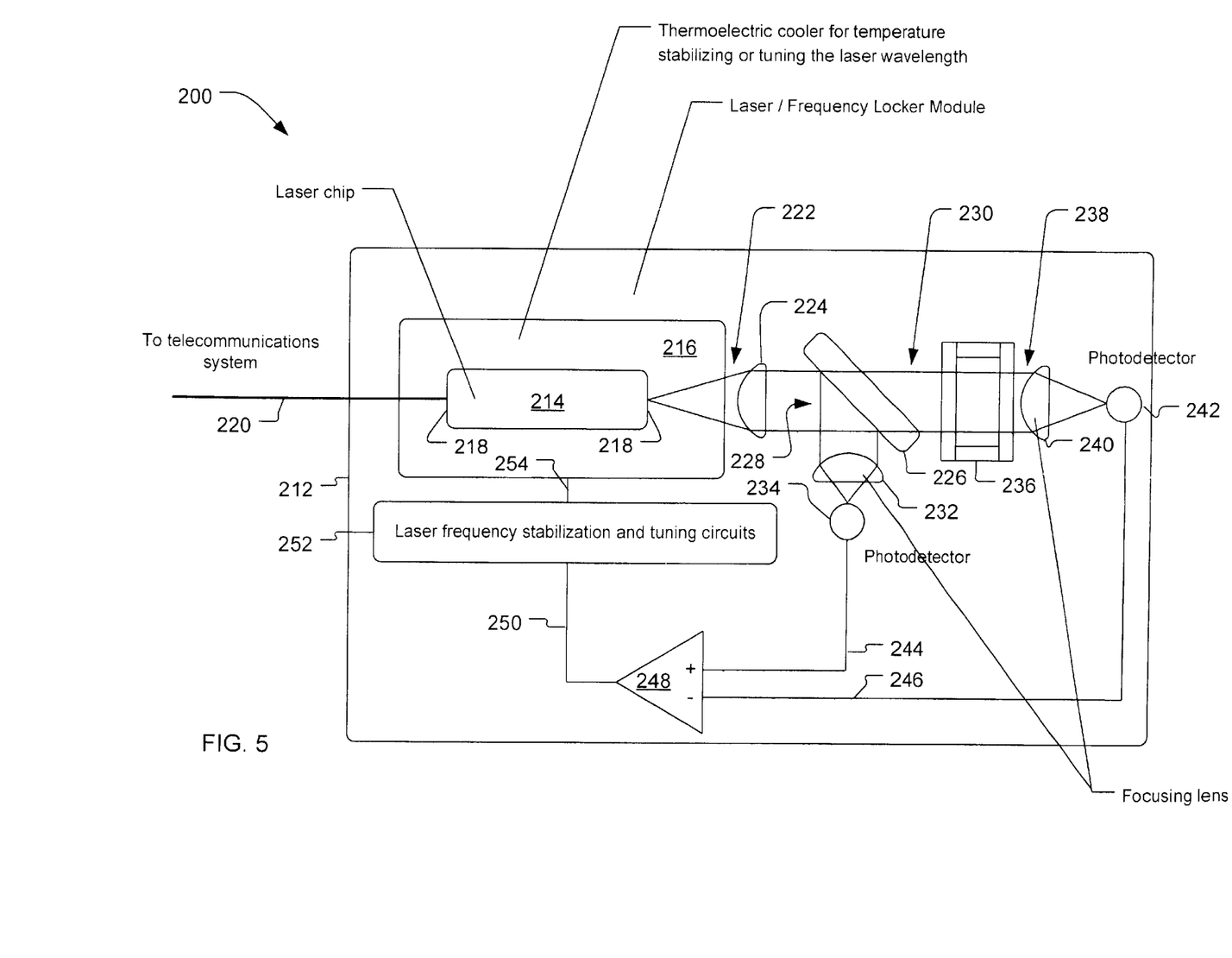
FIG. 5 is a schematic view of a single channel frequency locked light source according to the present invention.

FIG. 5 is a schematic view of a single channel frequency locked light source 200 also according to the present invention. Here a housing 212 contains a laser chip 214 mounted on a thermoelectric unit 216. The laser chip 214 has two facets 218, at opposed ends, and produces both an application beam 220 and a control beam 222 (i.e., two laser beams).

The control beam 222 is directed into a collimator 224. The application beam 220 is directed out of the locked light source 200 for use in an end application. It is typically also collimated, with an internal unit (not shown in this embodiment; see e.g., FIG. 2) or with an external unit. If and how this is done, however, is not germane here.

The control beam 222 passes through the collimator 224 and enters a beam splitter 226 where it is split into a reference beam 228 and a measurement beam 230. The reference beam 228 then passes through a first lens 232 which focuses it onto a reference detector 234. The measurement beam 230 passes through an interferometer 236 and becomes an interference beam 238. The interference beam 238 then passes through a second lens 240 which focuses it onto an interference detector 242.

The reference detector 234 produces a reference signal 244 based on the reference beam 228, and the interference detector 242 produces an interference signal 246 based on the interference beam 238. Both the reference signal 244 and the interference signal 246 are received by a differential amplifier 248 that combines them to produce a normalized signal 250. The normalized signal 250 is received by a processing circuit 252 that produces a correction signal 254 which is communicated to the thermoelectric unit 216.

The laser chip 214 can be a conventional device. The laser beams produced at its respective facets 218 typically will not have the same intensity, but when this is the case the locked light source 200 can usually use the lower intensity beam as the control beam 222 and permit the stronger beam to be used as the application beam 220.

The thermoelectric unit 216 can similarly be conventional. It can be a cooler, a heater, or a device which alternately heats or cools based on the correction signal 254. The choice of which will depend on design considerations and on the environment in which the locked light source 200 will be called upon to operate.

The collimator 224 and the lenses 232, 240 may all be quite conventional components. Similarly, the beam splitter 226 and the interferometer 236 may also be conventional. It should be appreciated, however, that the beam splitter 226 need not split the control beam 222 into the reference beam 228 and the measurement beam 230 in equal intensity. It may, for instance, be desirable to have the measurement beam 230 be of higher intensity, since it has to pass through the interferometer 236.

The detectors 234, 242 may also be conventional devices. For instance, photodiodes may be used in many embodiments. The differential amplifier 248 is shown separate from the processing circuit 252 in FIG. 5 to emphasize that this is possible to accommodate electronic design factors. The reference signal 244 and the interference signal 246 may be effected to electronic noise. The differential amplifier 248 can therefore be moved close to the detectors 234, 242 and away from the processing circuit 252 (which has other circuitry there may well even be a source of such electronic noise), and the normalized signal 250 can then be adequately amplified or otherwise provided for so that it is not adversely effected. Of course, in embodiments where there are no contrary concerns, the differential amplifier 248 and the processing circuit 252 can be combined into one circuit.

The processing circuit 252 will necessarily be particular to the locked light source 200, but constructing it is a relatively simple matter for one skilled in the electronic arts in view of this disclosure. It should be noted that no modulating means is shown in FIG. 5. As is the case for collimating the application beam 220, this can be provided for outside of the locked light source 200. But it can also be integrated into alternate embodiments. For example, one way to provide for this would be to integrate appropriate modulation circuitry with the processing circuit 252.

Finally, the housing 212 merits discussion. It has been shown only in outline in FIG. 5, but it can be tailored to meet the needs of a wide range of applications for the locked light source 200. It can be made so that the other components can be accessed, say, by making it a base on which the other components are mounted under a removable cover portion. Alternately, the housing 212 may be sealed at fabrication. For example, it may be filled with Nitrogen gas and hermetically sealed to meet the demanding standards of the telecommunications industry. No dimensions have been shown in FIG. 5, but production of the entire locked light source 200 with dimensions of less than 5 by 2 by 2 centimeters each is well within current industrial capability.

Figure 6:
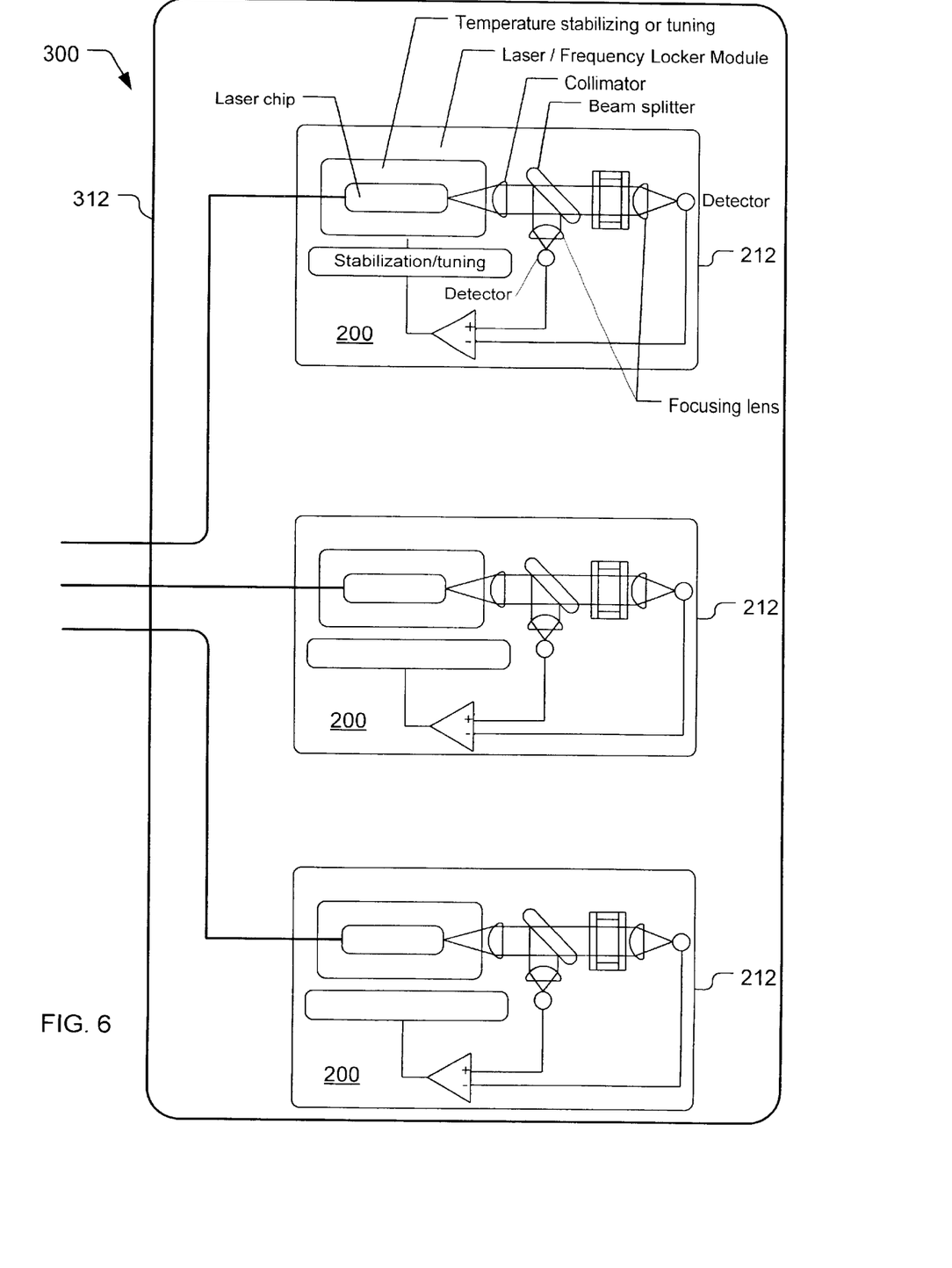
FIG. 6 is a schematic view of a multi-channel frequency locked light source employing a plurality of the frequency locked light sources of FIG. 5.

FIG. 6 is a schematic view of a multi-channel frequency locked light source 300 employing a plurality of the locked light sources 200 of FIG. 5. FIG. 3 (background art) should particularly be compared with FIG. 5. In FIG. 3 each channel includes an instance of the locker 10 and the laser module 54, whereas in FIG. 5 each channel simply includes an instance of the locked light source 200. The locked light sources 200 still include the housings 212, but here they may merely be bases holding the components of each respective locked light source 200 in fixed relationship. A larger, outer housing 312 is employed to hold the plurality of locked light sources 200, and it can be tailored to meet the needs of the end application. For example, it can be Nitrogen or inert gas filled and hermetically sealed to meet the standards of the telecommunications or other industries.

Figure 7:
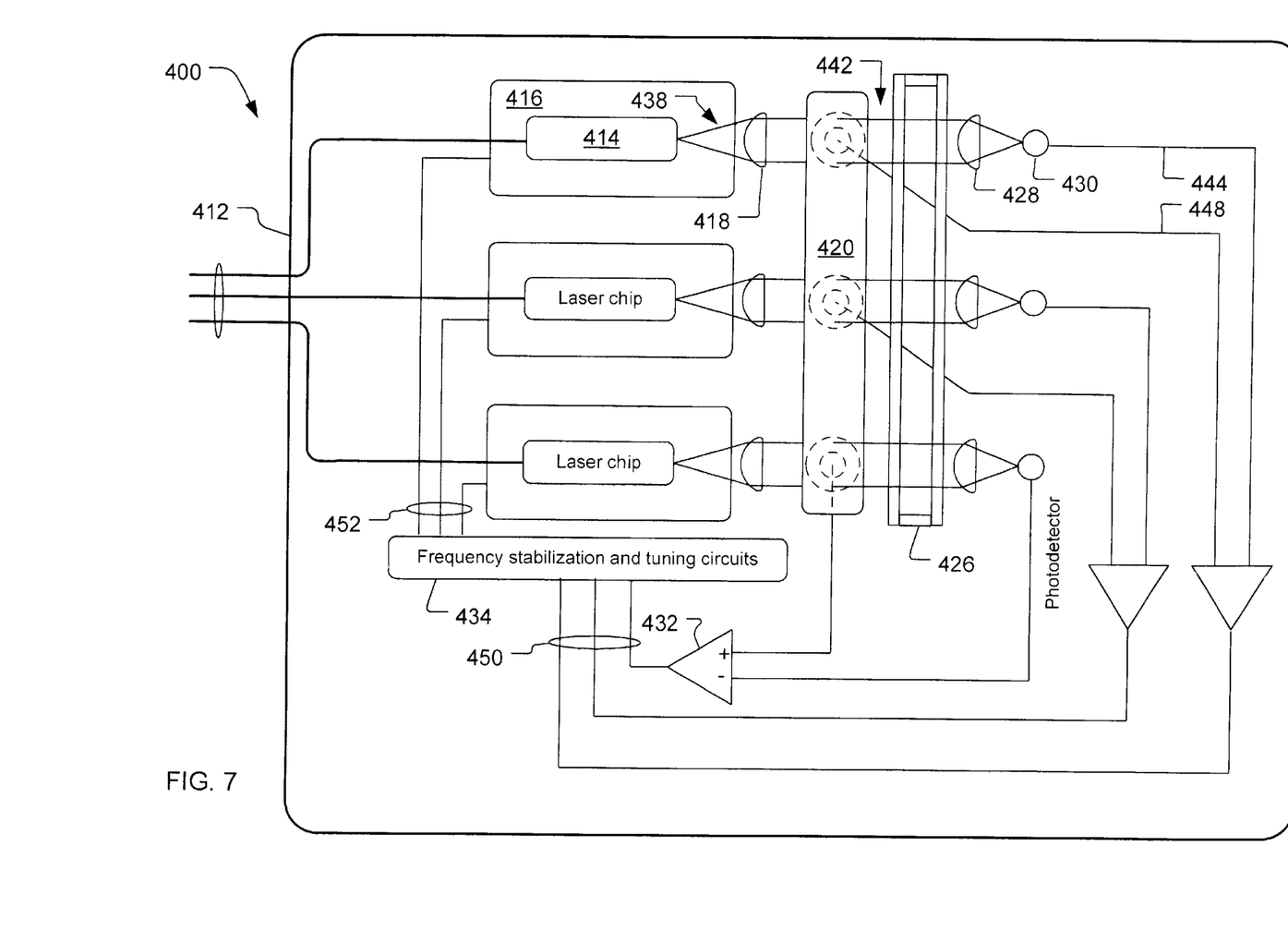
FIG. 7 is a schematic view of an integrated multi-channel frequency locked light source according to the present invention, with FIG. 7A showing a side view of portions of FIG. 7.
Figure 7A:
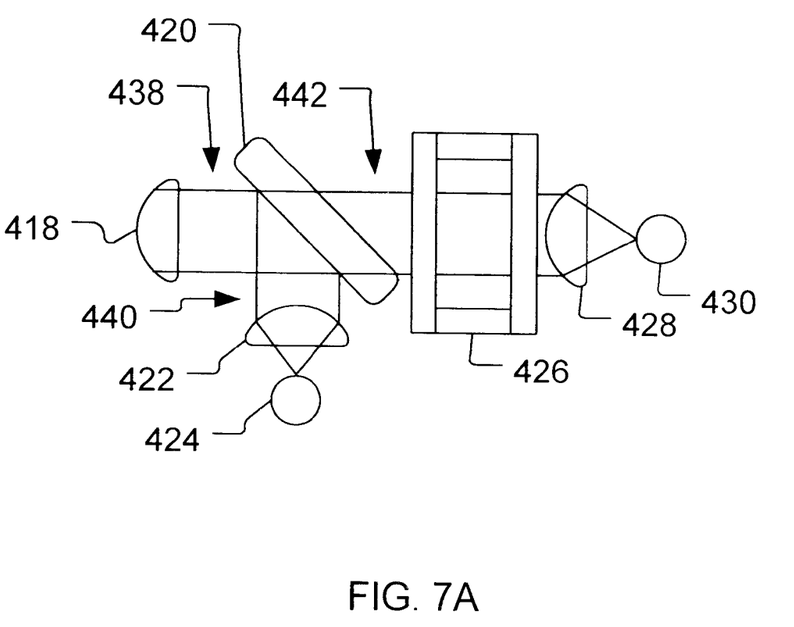

FIG. 7 is a schematic top plan view of an integrated multi-channel frequency locked light source 400 according to the present invention, with FIG. 7A showing a side view of portions of FIG. 7. This embodiment of the invention has a common housing 412; a plurality of laser chips 414 (one per channel); a like plurality of thermoelectric units 416; a like plurality of collimators 418; a single, common beam splitter 420; a plurality of first lenses 422 (also one per channel); a like plurality of reference detectors 424; a single, common interferometer 426; a plurality of second lenses 428 (again, one per channel); and a like plurality of interference detectors 430. Each pair of detectors 424, 430 in the respective channels has a differential amplifier 432; and a single, common processing circuit 434 serves all of the channels in the locked light source 400 here.

Each laser chip 414 produces an application beam 436 and a control beam 438. The control beams 438 are collimated by the respective collimators 418 and enter the common beam splitter 420, where they are separated into respective reference beams 440 and measurement beams 442. The reference beams 440 are received by the first lenses 422 and focused onto their respective reference detectors 424, where reference signals 444 are generated. The measurement beams 442 pass through the interferometer 426 and become interferometer beams 446. The interferometer beams 446 are received by the second lenses 428 and focused onto their respective interference detectors 430, where interference signals 448 are generated. The respective sets of reference signals 444 and interference signals 448 are processed by the differential amplifiers 432 to generate normalized signals 450. The normalized signals 450 are communicated to the processing circuit 434, which generates appropriate correction signals 452 and in turn communicates those to the respective thermoelectric units 416.

As can be seen, and as is similar to the case for the frequency locker 100 in FIG. 4, only the single beam splitter 420, the single interferometer 426, and the single processing circuit 434 are used in the locked light source 400 in FIGS. 7, 7A. This is in marked contrast with systems such as that depicted in FIG. 3 (background art), and even with less sophisticated embodiments of the invention such as that depicted in FIG. 6. The locked light source 400 in FIG. 7 also has only the single housing 412, which is similar to the outer housing 312 but without the multiple housings 212 in FIG. 6.

The principle of using common elements can be used to simplify even the locked light source 400 in FIGS. 7, 7A without violating the spirit of the present invention. For example, in some embodiments it is possible to eliminate the plurality of collimators 418, although this will typically complicate other aspects of working with the control beams 438. Alternately, a single, common bar-lens type collimator might be used. This can be envisioned by looking only at FIG. 7A and viewing the collimator 418 there as if it were one element extending into and out of the page, and serving all of the multiple control beams 438. This, admittedly, will not provide a theoretically optimal cross section in the control beams 438 as they exit such a single collimator but it may nonetheless prove adequate.

Continuing in this same vein, the very same approaches can be taken with respect to the focusing lenses 422, 428. They may be eliminated entirely or bar-type lenses may be used commonly for their functions (this can also be envisioned by looking only at FIG. 7A). In this manner the plurality of first lenses 422 can be reduced to as few as one lens, or the plurality of second lenses 428 can be reduced to as few as one lens, or all of the focusing lenses 422, 428 can be reduced to just two lenses. Another option is to use detectors which have integral lenses, as many commercially available photodetectors today do. The focusing lenses, in respective sets for each channel or as common units serving all channels, can then be supplanted by the integral lenses or supplemented by them.

The invention provides a number of benefits and these increase with the relative sophistication of the embodiments, as the preceding discussion of the locker 100, locked light source 200, locked light source 300, locked light source 400 illustrates. For one role the invention can be embodied as the locker 100 has been, as a mechanism for tuning and stabilizing a plurality of external light sources. Alternately, for another role the invention can be embodied as the locked light source 200 has been, as a completely integrated tuneable and stabalizable light source. To fill another role the invention can be embodied as the locked light source 300 has been, as a partially integrated set of tuneable and stabalizable light sources. Yet further, the invention can be embodied as the locked light source 400 has been, as a fully integrated source of multiple light beams which is tuneable and stabalizable with regard to frequency.

The use of common components provides a quite important benefit by itself: a high degree of reduced component-cost economy. For example, optical components such as those used for the beam splitters 114, 118 and the interferometer 128 (FIG. 4) are notoriously expensive, and it is a simple pragmatic fact that optical components sizable enough to handle three, or five, ten or 25, light beams are usually less expensive than individual components able to handle one beam each.

There is also, however, a more subtle set of benefits provided by using common components in the manner of the invention. Although subtle, these benefits are important, and they may even outweigh any component-cost increase in the rare case where a single common component is more expensive than multiple discrete components. This set of benefits includes fabrication and usability improvements over the prior art, and some key examples are labor reduction, uniformity in operation, and non-catastrophic failure characteristics.

There are many aspects of labor reduction which the invention can provide. Obviously, constructing the multi-channel frequency locker 100 of FIG. 4 is easier than constructing three instances of the single channel frequency locker 10 of FIG. 1, since the fewer parts needed will require less handling. More importantly, however, is that in may manufacturing scenarios the parts make common by the invention are those most difficult to set-up (i.e., to initially calibrate). Thus, for example, orienting the one first beam splitter 114 is easier than orienting three instances of the first beam splitter 14 (and providing multiple orienting mechanisms and housing-structure to support such is another matter).

Post manufacturing labor operations are similarly eased. Recalibration and adjusting for new sets of light frequencies are simplified. For example, vibration present in an application can effect the orientations of the single second beam splitter 118 or of three second beam splitters 18, and it is obviously easier to have to perform only one recalibration operation. Similarly, to change one interferometer 128, by replacement or by adjusting the air-spacing of the etalon, is much easier and less error prone than doing so for three interferometers 28.

Uniformity in operation provides other advantages. It was noted above that it is easier to perform a single calibration operation verses multiple ones. However, with regard to the common components, there is also no need to perform more than one calibration or adjustment, since all channels will be similarly effected. This provides more than labor savings, it also provides an increased level of confidence in the overall system and it minimizes operational down time or system off-line time. In fact, in up-time critical applications an added monitoring channel can even be added and used to maintain confidence that the other channels sharing components common with the monitoring channel are operating as desired. Prior art approaches have no such capability and adding a monitoring channel according would provide virtually no added confidence.

The present invention can also provide non-catastrophic failure characteristics. Passing mention has been made above of the ITU grid of standard frequencies and it was also observed that adjacent channels in prior art systems can drift together and undermine system utility. In the invention, by use of common components, can insure that drift often will be equivalent in magnitude and in the same "direction" (increase or decrease in light frequency). Consider the multi-channel frequency locked light source 400 in FIG. 7 for one example. If the air spacing in the interferometer 426 changes over time, say, due to a temperature increase, all of the channels will be much more similarly effected than would be the case in a prior art system. Similarly, if an electrical characteristic in the processing circuit 434 changed, say, a biasing voltage, for instance, the channels would all be similarly effected. Drift caused by the common components in the invention will generally be in concert. Thus, the sets of frequencies produced will not as likely interfere with one another and when the present invention is employed drift will often be less than catastrophic and the overall system may remain functional where prior art system would fail.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

INDUSTRIAL APPLICABILITY

The present invention is well suited for application in tuning and stabilizing external light sources or for integration with and forming tuneable and stabalizable light sources. The locker 100, locked light source 200, locked light source 300, locked light source 400 have been presented as example embodiments to illustrate this.

As has been described, the current tendency in the art is work with light sources and tuning mechanisms which are discrete. The present invention permits continuation of this practice, but with significant improvement. Embodiments of the invention, like the locker 100, can be employed discretely from the light sources where particular applications require, or merely where designers prefer. This can be in new systems, but it also has particular use in existing system. In this regard, embodiments of the invention like the locker 100 can serve a valuable role as a replacement component. For instance, if one locker 10 in a three channel locked light source 80 like that depicted in FIG. 3 (background art) failed, the locker 100 could be substituted for all three of the one-channel lockers 10.

The present invention also, however, permits a graceful migration away from the use of discrete light sources and tuning mechanisms. Embodiments of the invention, like the locked light source 200 and the locked light source 300 depicted in FIGS. 4 and 5 are particularly suitable for this. The locked light source 200 shows how the invention provides benefits even when only a single-channel is needed. Integrating all of the components facilitates making the overall structure smaller. Integrating all of the components in the single housing 212 is also important. Even if the housing 212 is merely a base, that removes set-up and potential recalibration burdens in the end application. It also removes the need for any possible intervening optics, such as fiber optic cabling. Having the housing 212 fully enclosing the components permits sealing the entire light source. This has particular importance in industries such as telecommunications, where standards may require gas filling, hermetic sealing, and testing the complete assembly at high or low temperature.

If applications require, or if designers prefer, embodiments of the invention like the locked light source 300 are available to construct multi-channel systems as a plurality of single channels, optically. The result, however, can still benefit from the use of a common housing 312.

Finally, to get away from the use of discrete light sources and tuning mechanisms entirely, sophisticated embodiments of the invention like the locked light source 400 depicted in FIGS. 7, 7A can be employed. Embodiments like this provide multiple channels in a single housing. The solutions which the invention provides here can have small form factors, excellent economy, increased robustness and reliability, high performance, and even non-catastrophic failure characteristics when design specifications are somewhat exceeded.

The present invention employs generally conventional technology and skills, albeit in novel manners. Once the teachings herein are appreciated, the individual components of embodiments of the invention may be the same as are currently used and trusted. Those components generally need merely be fewer in number and larger in scale. Similarly, those having reasonable skills in the requisite arts should now have little if any difficulty constructing embodiments of the invention.

For the above, and other, reasons, it is expected that the present invention will have widespread industrial applicability and it is expected that the commercial utility of the present invention will be extensive and long lasting.

What is claimed is:

1. A multi-channel frequency locking light source, comprising:
   a plurality of lasers to each produce a light beam having a light frequency;
   at least one optical component common to said light beams;
   a detection system to produce respective correction signals representing any differences in frequency between said light frequencies and desired frequencies; and a like plurality of tuning systems to adjust each said laser to change its respective said light frequency based on said correction signal.

2. The frequency locking light source of claim 1, wherein said lasers are semiconductor based devices.

3. The frequency locking light source of claim 2, wherein said lasers each emit at least two said light beams both having said light frequency, thereby permitting one said light beam to be used by said detection system and the other said light beam to be used for other purposes.

4. The frequency locking light source of claim 1, wherein said tuning systems include respective temperature changing units to change the temperature of a said laser based on a said correction signal.

5. The frequency locking light source of claim 1, wherein said desired frequencies are International Telecommunication Union (ITU) frequencies, thereby permitting said light frequencies to be tuneably locked in relation to ITU standards.

6. The frequency locking light source of claim 1, wherein said detection system includes:
   a plurality of reference detectors to each receive one said reference beam and produce therefrom a reference signal;
   a plurality of interference detectors to each receive one said interference beam and produce therefrom an interference signal representative of said interference therein; and
   a processing circuit to receive said reference signals and said interference signals and produce said correction signals based thereon.

7. The frequency locking light source of claim 6, wherein a beam splitter is one said optical component which is common to said light beams.

8. The frequency locking light source of claim 6, wherein an interferometer is one said optical component which is common to said light beams.

9. The frequency locking light source of claim 8, wherein said interferometer includes at least one member of the set consisting of solid etalons, air-spaced etalons, interference filters, and diffractive gratings.

10. The frequency locking light source of claim 6, wherein at least one of said reference detectors and said interference detectors include photodiode type photodetectors.

11. The frequency locking light source of claim 6, wherein said processing circuit compares said reference signals and said interference signals differentially to produce said correction signals.

12. The frequency locking light source of claim 1, further comprising a housing containing said plurality of lasers, said optical components common to said light beams, said detection system, and said plurality of tuning systems, thereby forming to a single physical unit.

13. The frequency locking light source of claim 12, wherein said housing includes a base common to said plurality of lasers, said optical components common to said light beams, said detection system, and said plurality of tuning systems.

14. The frequency locking light source of claim 12, wherein said housing includes an enclosure commonly containing said plurality of lasers, said optical components common to said light beams, said detection system, and said plurality of tuning systems.

15. The frequency locking light source of claim 14, wherein said enclosure is hermetically sealed.

16. A multi-channel frequency locker to lock a plurality of tunable light sources producing light beams having respective light frequencies, comprising:
   at least one optical component common to said light beams; and
   a detection system to produce and provide to the plurality of tunable light sources respective correction signals representing any differences in frequency between the light frequencies and desired frequencies;
   wherein said detection system includes:
      a plurality of reference detectors to each receive one said reference beam and produce therefrom a reference signal;
      a plurality of interference detectors to each receive one said interference beam and produce therefrom an interference signal representative of said interference therein; and
      a processing circuit to receive said reference signals and said interference signals and produce said correction signals based thereon.

17. The multi-channel frequency locker of claim 16, wherein said desired frequencies are International Telecommunication Union (ITU) frequencies, thereby permitting said light frequencies to be tuneably locked in relation to ITU standards.

18. The multi-channel frequency locker of claim 16, wherein a beam splitter is one said optical component which is common to said light beams.

19. The multi-channel frequency locker of claim 16, wherein an interferometer is one said optical component which is common to said light beams.

20. The multi-channel frequency locker of claim 19, wherein said interferometer includes at least one member of the set consisting of solid etalons, air-spaced etalons, interference filters, and diffractive gratings.

21. The multi-channel frequency locker of claim 16 wherein at least one of said reference detectors and said interference detectors include photodiode type photodetectors.

22. The multi-channel frequency locker of claim 16 wherein said processing circuit compares said reference signals and said interference signals differentially to produce said correction signals.

23. The multi-channel frequency locker of claim 16, further comprising a housing common to all of said optical components common to said light beams and said detection system.

24. The multi-channel frequency locker of claim 23, wherein said housing is hermetically sealed.

25. A multi-channel frequency locking light source, comprising:
   a plurality of lasers to each produce a light beam having a light frequency;
   at least one optical component common to said light beams;
   detection means for producing respective correction signals representing any differences in frequency between said light frequencies and desired frequencies; and
   a like plurality of tuning means for adjusting each said laser to change its respective said light frequency based on said correction signal.

26. The frequency locking light source of claim 25, wherein said detection system includes:
   a plurality of reference detection means for each detectably receiving one said reference beam and producing therefrom a reference signal;
   a plurality of interference detection means for each detectably receiving one said interference beam and producing therefrom an interference signal representative of said interference therein; and a processing means for receiving said reference signals and said interference signals and producing said correction signals based thereon.

27. The frequency locking light source of claim 25, wherein optical components common to said light beams includes at least one of a beam splitting means and an interferometry means.

28. The frequency locking light source of claim 25, further comprising a housing containing said plurality of lasers, said optical components common to said light beams, said detection means, and said plurality of timing means, thereby forming a single physical unit.

29. A multi-channel frequency locker to lock a plurality of tunable light sources producing light beams having respective light frequencies, comprising:

beam splitting means to receive and separate the light beams into respective reference beams and measurement beams;

interferometry means for receiving said measurement beams and producing interference therein, thereby making said measurement beams into interference beams;

a plurality of reference detection means for detectably receiving one said reference beam and producing therefrom a reference signal;

a plurality of interference detection means for detectably receiving one said interference beam and producing therefrom an interference signal representative of said interference therein;

processing means for receiving said reference signals and said interference signals, producing correction signals representing any differences in frequency between the light frequencies and desired frequencies, and providing said correction signals to the plurality of tunable light sources; and at least one of said beam splitting means and said interferometry means include at least one optical component common to the light beams.

30. The multi-channel frequency locker of claim 29, further comprising a housing common to all of said beam splitting means, said interferometry means, and said processing means.

* * * * *